(12) United States Patent
Akatsuchi et al.

(10) Patent No.: US 8,080,333 B2
(45) Date of Patent: Dec. 20, 2011

(54) BATTERY PACK

(75) Inventors: Osamu Akatsuchi, Ibaraki (JP); Hiroshi Yamamoto, Ibaraki (JP); Takashi Sumida, Ibaraki (JP)

(73) Assignee: Hitachi Maxell Engery, Ltd., Otokuni-Gun, Kyoto (JP)

( * ) Notice: Subject to any disclaimer, the term of this patent is extended or adjusted under 35 U.S.C. 154(b) by 730 days.

(21) Appl. No.: 12/239,605

(22) Filed: Sep. 26, 2008

(65) Prior Publication Data

US 2009/0087734 A1 Apr. 2, 2009

(30) Foreign Application Priority Data

Sep. 27, 2007 (JP) ................... 2007-251794

(51) Int. Cl.
*H01M 2/02* (2006.01)
*H01M 2/10* (2006.01)
*H01M 2/30* (2006.01)

(52) U.S. Cl. ...................................... 429/178
(58) Field of Classification Search .................. 429/178
See application file for complete search history.

(56) References Cited

U.S. PATENT DOCUMENTS

2005/0208345 A1* 9/2005 Yoon et al. ................. 429/7
2006/0228623 A1 10/2006 Ebi et al.

FOREIGN PATENT DOCUMENTS

| CN | 1763990 A | 4/2006 |
| CN | 1799155 A | 7/2006 |
| JP | 2003-197270 A | 7/2003 |
| JP | 2006-114468 A | 4/2006 |

OTHER PUBLICATIONS

Machine English translation of JP-2006-114468-A which published Apr. 27, 2006.
Machine English translation of JP-2003-197270-A which published Apr. 27, 2006.

* cited by examiner

*Primary Examiner* — Gregg Cantelmo
(74) *Attorney, Agent, or Firm* — Birch, Stewart, Kolasch & Birch, LLP (57) ABSTRACT

Positive and negative terminals formed on a top face of a unit cell and positive and negative terminals formed on a surface of a circuit board opposed to the unit cell are electrically connected to each other by connectors. The connectors each include an elastic body formed from an elastic material, and a conductor which is placed so as to be exposed on upper and lower surfaces of the elastic body and which serves for electrically connecting those exposed portions to each other. By elastic restoring force of the elastic body generated by elastic compression of the elastic body between the terminals, the upper and lower surfaces of the connectors are put into press contact between the opposing positive and negative terminals of the unit cell and the circuit board, by which their electrical connection is maintained.

9 Claims, 11 Drawing Sheets

BATTERY PACK

BACKGROUND OF THE INVENTION

1. Field of the Invention

The present invention relates to a battery pack in which a protection circuit for controlling charging/discharging currents is mounted inside an exterior cover settled at an upper end of a unit cell.

2. Description of Related Art

In this type of battery pack, it is becoming mainstream that a circuit board and a protective device, or positive and negative leads or other electrical components are intensively placed on a sealed surface side of the unit cell. The electrical connection structure between the unit cell and the circuit board for such a kind of battery pack has been proposed in several forms to substitute for spot welding. For instance, in a battery pack disclosed in JP 2006-114468 A, positive and negative terminals of the unit cell and positive and negative terminals of the circuit board are electrically connected to each other by gold-plated, compression coil-type connectors or plate spring-type connectors. A connection structure using compression coil-type connectors is disclosed also in JP 2003-197270 A.

SUMMARY OF THE INVENTION

In a connection structure having compression coil-type connectors, the connectors are provided in a compressed state between oppositely placed terminals of the unit cell and the circuit board, respectively, so that upper and lower ends of the connectors are set into press contact with the terminals by elastic restoring force of coils. Due to this, upper-and-lower ends of a coil and terminals are in contact with each other each at substantially as small as one contact point, which may cause chattering to occur upon reception of mechanical vibrations, so that terminal-to-terminal electrical connections tend to be unstable.

A plate spring-like connector can be easily increased in the number of contact points with positive and negative terminals, involving less possibility of occurrence of chattering as compared with the compression coil-type connectors. However, plate spring-like connectors are narrow in elastic deformation range and therefore susceptible to parts precision of the plate spring itself, opposing distance precision between the terminals, assembly precision and the like, making it difficult to ensure a stable electrical connection between the terminals.

Accordingly, an object of the present invention is to provide a battery pack which can be made less susceptible to parts precision of the connector itself, opposing distance precision between terminals and the like, and which allows the unit cell and the circuit board to be electrically connected to each other with reliability.

In order to achieve the above object, the present invention has the following constitutions.

According to a first aspect of the present invention, there is provided a battery pack comprising:

a unit cell in which a first electrode terminal is formed on a terminal formation surface;

an exterior cover fixed so as to cover the terminal formation surface of the unit cell;

a circuit board which has a protection circuit for controlling a charging current and a second electrode terminal electrically connected to the protection circuit, and which is placed inside the exterior cover so that the second electrode terminal is opposed to the first electrode terminal of the terminal formation surface of the unit cell; and a connector placed between the first electrode terminal and the second electrode terminal so as to electrically connect the first electrode terminal and the second electrode terminal to each other, wherein the connector comprises:

an elastic body formed from an elastic material; and a conductor which is fixed to the elastic body so as to be exposed at, at least, opposite positions in surfaces of the elastic body and which makes the exposed portions in the opposite positions electrically connected to each other, wherein in a state that the elastic body is elastically compressed so that the exposed portions of the conductor in the opposite positions are in press contact with the first electrode terminal and the second electrode terminal, respectively, the first electrode terminal and the second electrode terminal are maintained electrically connected to each other by the connector.

According to a second aspect of the present invention, there is provided the battery pack as defined in the first aspect, wherein the elastic body is formed from a rubber material.

According to a third aspect of the present invention, there is provided the battery pack as defined in the first aspect, wherein the conductor is a conductive thin film placed on the surface of the elastic body.

According to a fourth aspect of the present invention, there is provided the battery pack as defined in the first aspect, wherein the conductor is a plurality of conductive linear members placed on the surface of the elastic body.

According to a fifth aspect of the present invention, there is provided the battery pack as defined in the fourth aspect, wherein a plurality of conductive linear members are wound on the surface of the elastic body.

According to a sixth aspect of the present invention, there is provided the battery pack as defined in the first aspect, further comprising a holder for holding the circuit board, the holder being fixed, inside the exterior cover, to the terminal formation surface of the unit cell, wherein the holder comprises:

a connector holding portion having a through hole shape for holding a placement position of the connector in a state that the conductor is in contact with the first electrode terminal of the unit cell; and a circuit board holding portion having a recessed shape for holding the circuit board in a state that the elastic body is elastically compressed while the second electrode terminal of the circuit board is kept in contact with the conductor of the connector held by the connector holding portion.

According to a seventh aspect of the present invention, there is provided the battery pack as defined in the sixth aspect, wherein the exterior cover and the holder are formed from resin material, and the exterior cover and the holder are joined and fixed to each other by ultrasonic welding.

According to an eighth aspect of the present invention, there is provided the battery pack as defined in the seventh aspect, wherein protrusive junction portions are provided in opposing surfaces of the exterior cover and the holder, and the junction portions and an outer surface of the holder are integrally united together by ultrasonic welding, whereby the exterior cover and the holder are joined and fixed together.

According to a ninth aspect of the present invention, there is provided the battery pack as defined in the eighth aspect, wherein a support member for fixing the exterior cover and the holder is fixed at an upper end portion of the unit cell, the support member is an L-shaped metal fixture including a leg piece whose one end is fixed to the unit cell and which extends vertically, and a horizontal piece which adjoins the other end of the leg piece and which is bent horizontally, a through hole into which a protrusive junction portion is to be inserted is formed in the horizontal piece, the holder and the circuit board are placed between an upper end of the unit cell and the horizontal piece, and forward ends of the junction portions inserted into the through holes and the outer surface of the holder are integrally united together by ultrasonic welding, whereby the exterior cover and the holder are fixed to the support member.

According to the present invention, a connector for electrically connecting the first electrode terminal of the unit cell and the second electrode terminal of the circuit board to each other is formed so as to include an elastic body formed from an elastic material and a conductor which is fixed to the elastic body and which is exposed at, at least, opposite positions in surfaces of the elastic body. Therefore, with the connector assembled to the unit cell, the exposed portions of the conductor are put into press contact between the two electrode terminals of the unit cell and the circuit board by elastic compression of the elastic body, so that electrical connection between the two electrode terminals by the connector can be maintained. Thus, contactability between the first electrode terminal of the unit cell as well as the second electrode terminal of the circuit board and the conductor of the connector can be enhanced, so that electrical contactability between the two electrode terminals can be improved. Therefore, occurrence of chattering can be suppressed, and a battery pack of high reliability can be obtained. Also, the need for welding work between the connector and the two electrode terminals can be eliminated, so that a battery pack which excels also in eliminating the possibility of connection failures due to welding failures can be obtained.

Further, the battery pack of the invention adopts a mode in which the elastic body formed from an elastic material is elastically deformed in itself, making it possible to set a larger elastic deformation range while the connector itself is reduced in size, as compared with the mode in which elasticity is structurally obtained as in conventional plate spring-like connectors or the like. Consequently, the battery pack can be made less susceptible to parts precision of the connectors themselves, opposing distance precision between terminals, assembly precision and the like, allowing a stable electrical connection state between electrode terminals to be obtained.

BRIEF DESCRIPTION OF THE DRAWINGS

These aspects and features of the present invention will become clear from the following description taken in conjunction with the preferred embodiments thereof with reference to the accompanying drawings, in which.

DETAILED DESCRIPTION OF THE PREFERRED EMBODIMENTS

Before the description of the present invention proceeds, it is to be noted that like parts are designated by like reference numerals throughout the accompanying drawings.

Hereinbelow, embodiments of the invention will be described in detail with reference to the drawings.

First Embodiment

Figure 1:
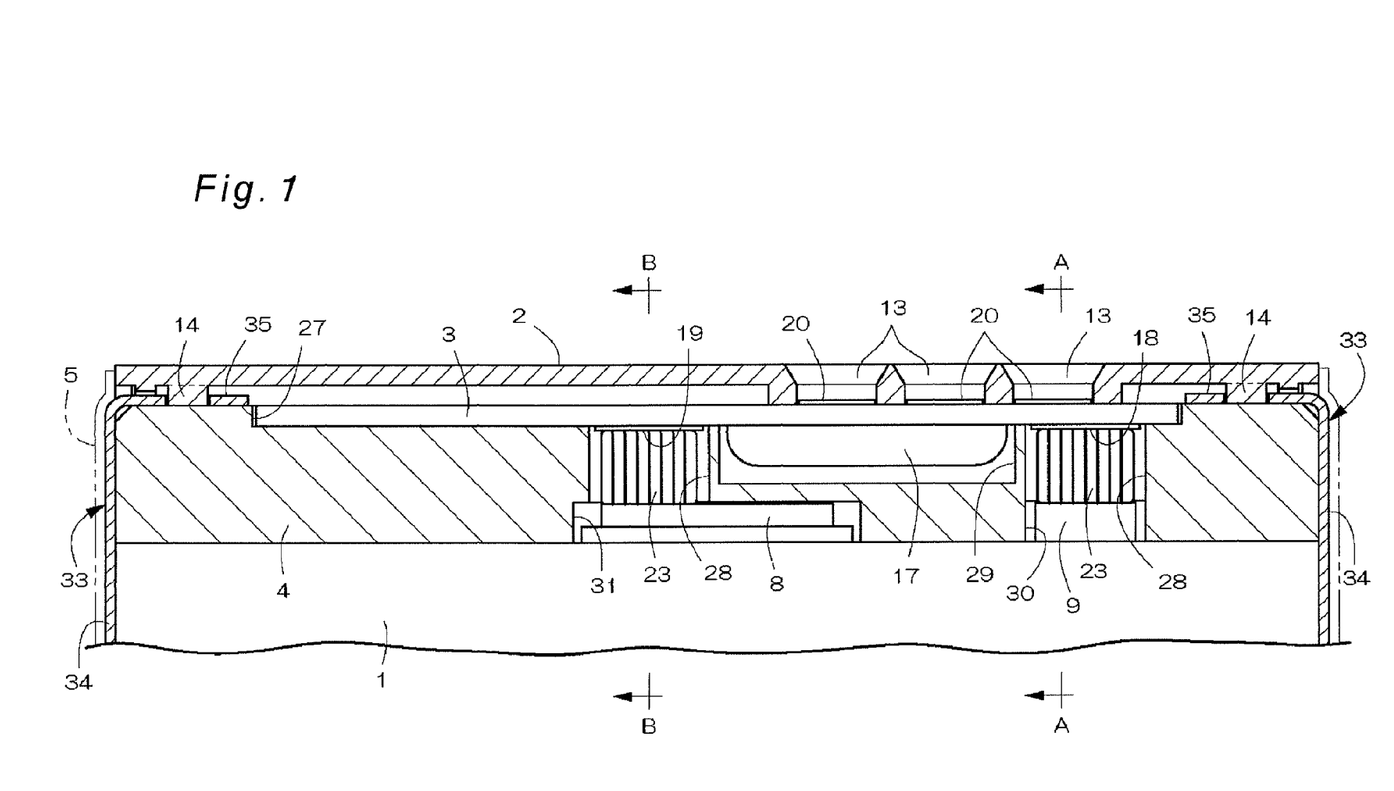
FIG. 1 is a longitudinal front view of main part of a battery pack according to a first embodiment.
Figure 2:
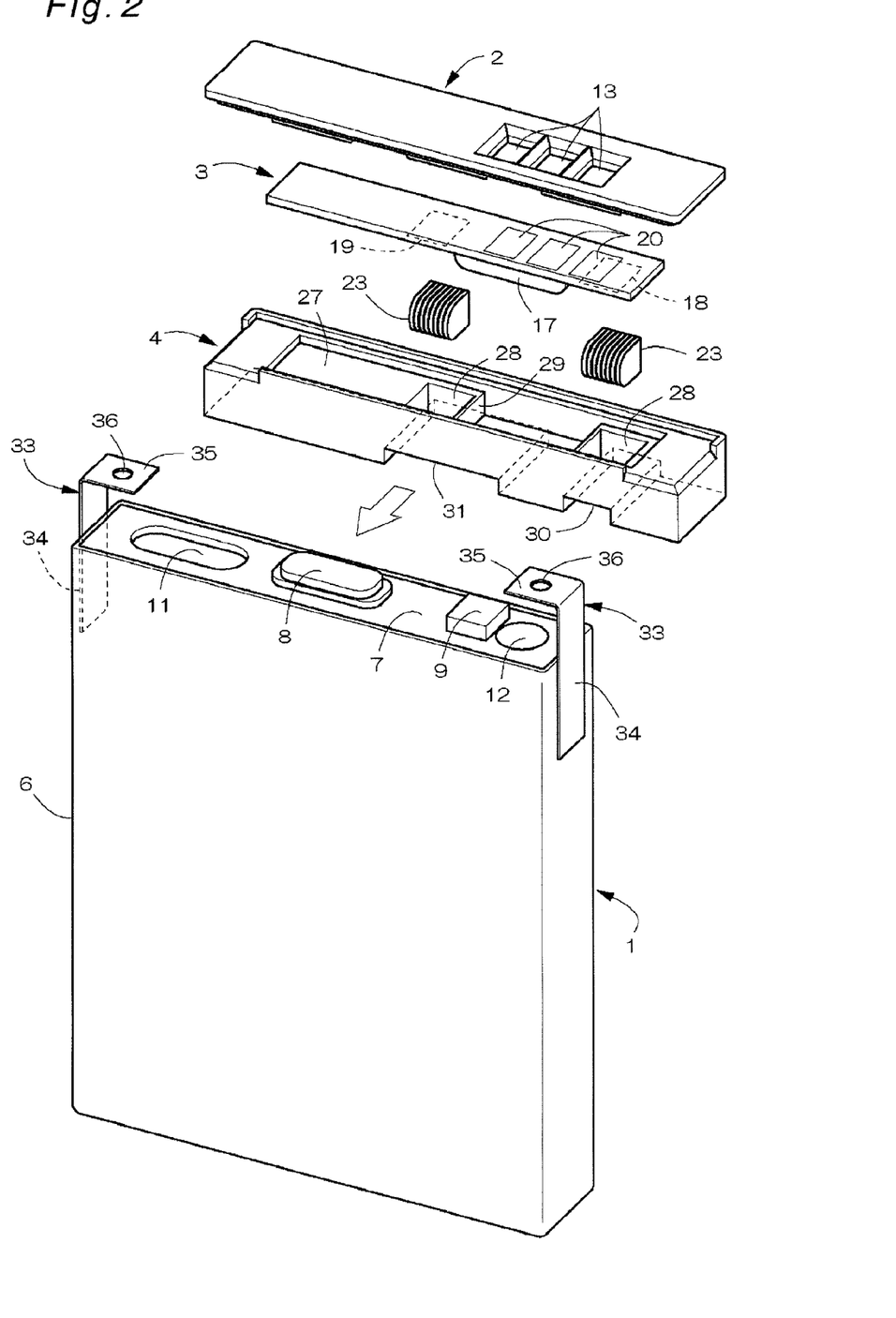
FIG. 2 is an exploded perspective view of the battery pack of the first embodiment.

FIGS. 1 to 7 show a first embodiment of the battery pack according to the invention. Referring to FIG. 2, the battery pack includes a unit cell 1 which is a chargeable/dischargeable secondary battery such as lithium ion battery, an exterior cover 2 placed on the upper surface side of the unit cell 1, a circuit board 3 placed between the unit cell 1 and the exterior cover 2, a holder 4 placed on top of the unit cell 1 to hold the circuit board 3, a facing label 5 (see FIG. 5) for covering outer surfaces of these constituent members, and the like.

The unit cell 1 includes a bottomed flat cylindrical exterior case 6 as a base body, an electrode body and an electrolyte contained inside, where an upward opening of the exterior case 6 is sealed by a sealing plate 7. The exterior case 6 is formed as a deep-drawn article by using a material of aluminum, aluminum alloy or stainless steel material. The sealing plate 7, which is formed as a press-formed article by using a material of aluminum or aluminum alloy, is fixed to the exterior case 6 by laser welding so that the sealing plate 7 is fitted into an opening inner surface of the exterior case 6.

As shown in FIG. 2, a negative terminal 8 is formed swollen at a top face center of the sealing plate 7, while a block piece 9 serving as an positive terminal is formed swollen on one left-right side end portion (right side end in the drawing case) of the sealing plate 7. Hereinafter, the block piece 9 will be referred to as positive terminal 9. The negative terminal 8 and the positive terminal 9 are set equal to each other in top face height. Also, the sealing plate 7 is provided with an explosion-proof cleavage vent 11, and a filler port 12 for filling of electrolyte. When internal pressure of the unit cell 1 increases over a certain value, the cleavage vent 11 brakes to allow the gas in the unit cell 1 to be discharged. The filler port 12 is hermetically sealed by a sealing plug after the filling of electrolyte. In addition, in this embodiment, a surface of the sealing plate 7 serves as a terminal formation surface, and the negative terminal 8 and the positive terminal 9 are an example of the first electrode terminal.

Figure 3:
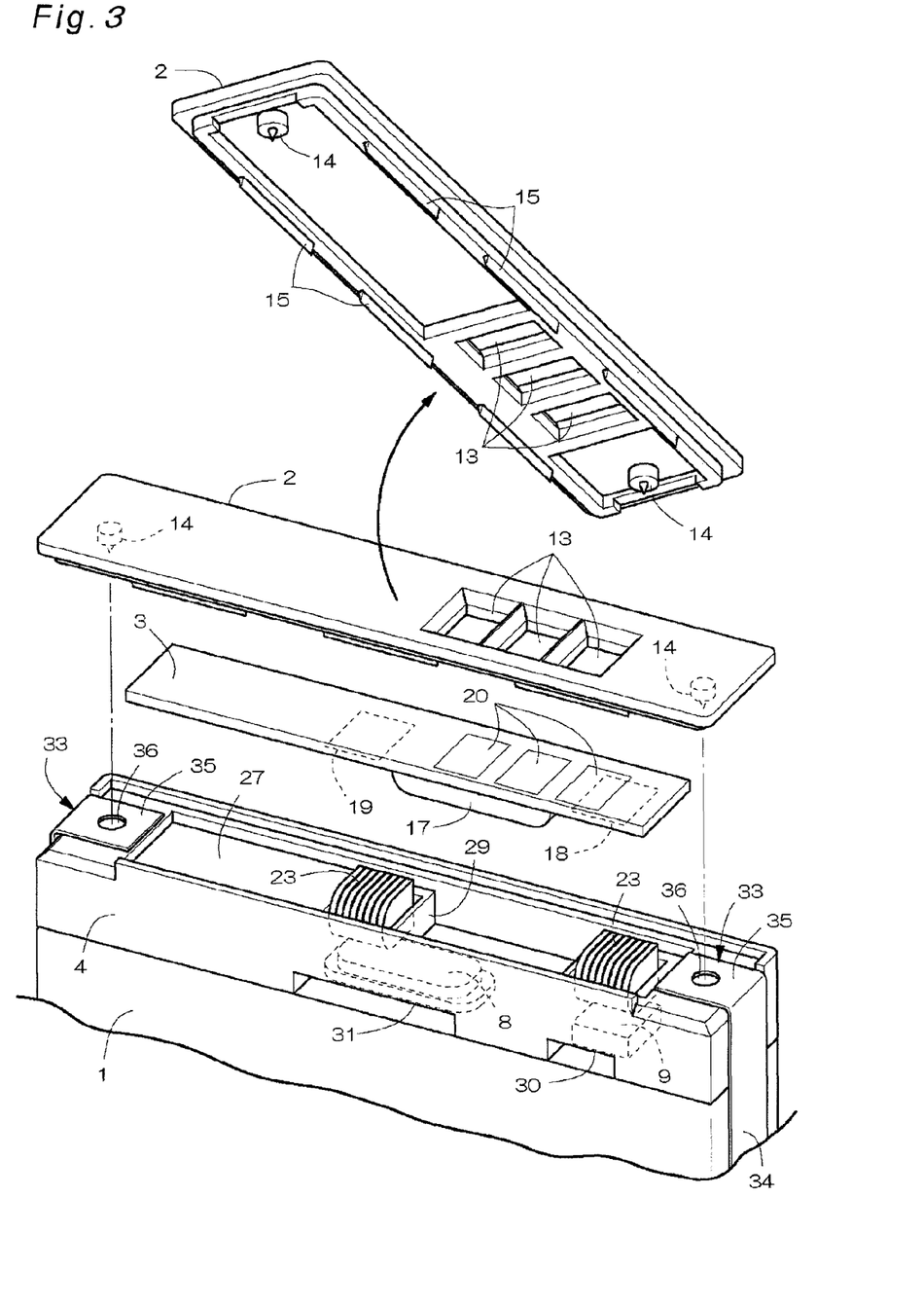
FIG. 3 is a perspective view showing a state in which the exterior cover and the circuit board are separated from the battery pack of the first embodiment.

The exterior cover 2 is formed as a plate-like injection molded article from a thermoplastic plastic material such as polycarbonate. As shown in FIG. 2, three electrode windows 13 are provided at regular intervals in the left-right direction. As shown in FIG. 3, protrusive junction portions 14 for ultrasonic welding use are provided at left-right end portions of the lower surface of the exterior cover 2, respectively, and rib-like junction portions 15 for ultrasonic welding use as well are provided at forward-and-backward peripheral edges of the lower surface.

The circuit board 3 is a left-to-right long, rectangular-shaped printed board, in which electronic components constituting a protection circuit are mounted on the lower surface side of the circuit board 3 and covered with resin mold. This mold portion is denoted by reference numeral 17. On both sides of the mold portion 17 are provided a positive terminal 18 and a negative terminal 19, respectively. On a top face of the circuit board 3 are formed three external output electrodes 20. Positions where the external output electrodes 20 are formed and positions where the electrode windows 13 are formed are in correspondence to each other, respectively. Among the external output electrodes 20, neighboring two are positive-side and negative-side output terminals, the remaining one being an input terminal for feeding a control signal to the protection circuit. By feeding a control signal from the external to the protection circuit via the input terminal, charging current and discharging current can be controlled properly to protect the unit cell 1. In addition, in this embodiment, the positive terminal 18 and the negative terminal 19 of the circuit board 3 are an example of the second electrode terminal.

Figure 4:
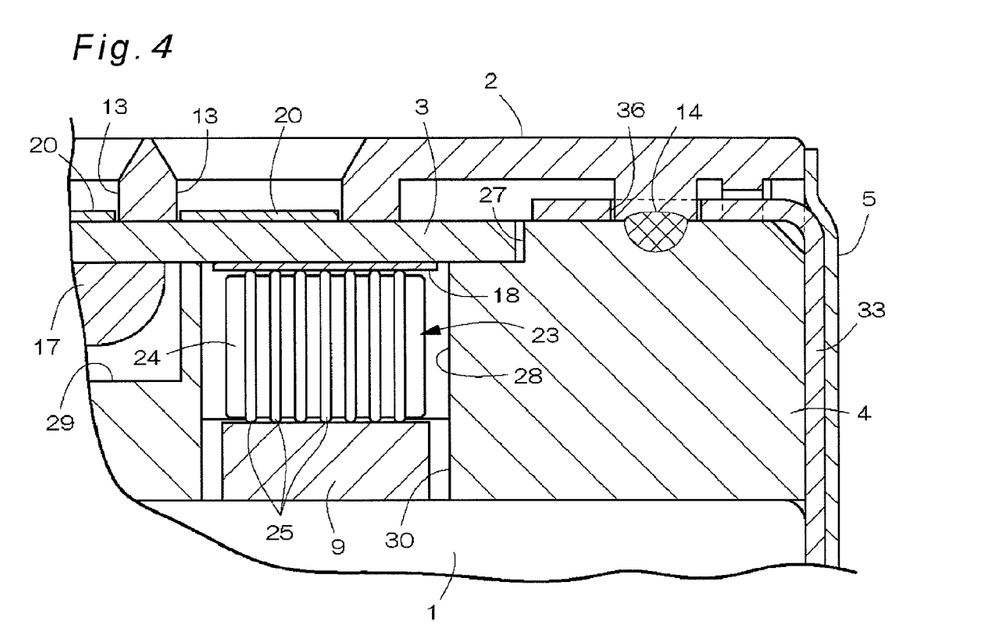
FIG. 4 is a view showing part of FIG. 1 under magnification.
Figure 5:
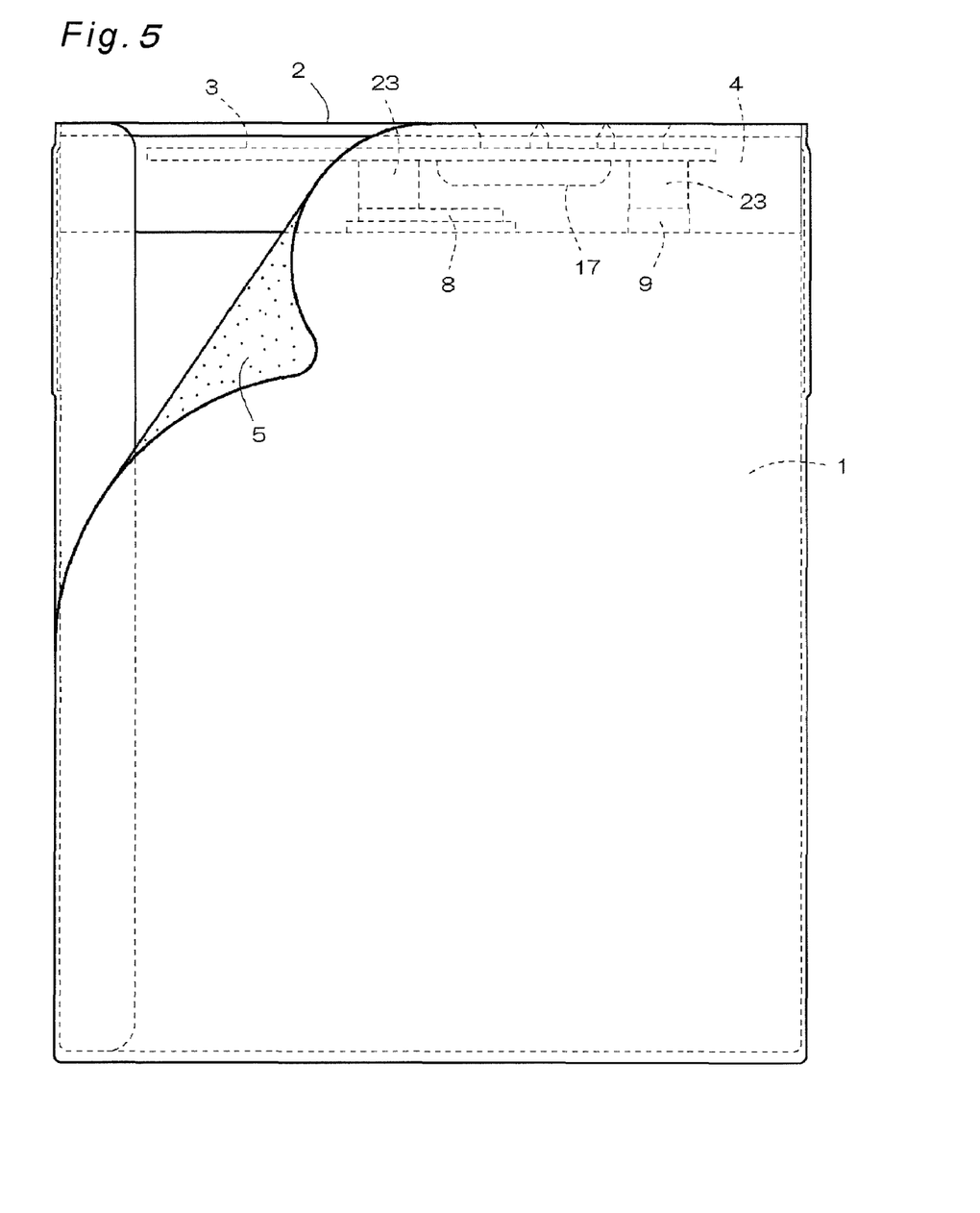
FIG. 5 is a front view showing a whole configuration of the battery pack of the first embodiment.
Figure 6:
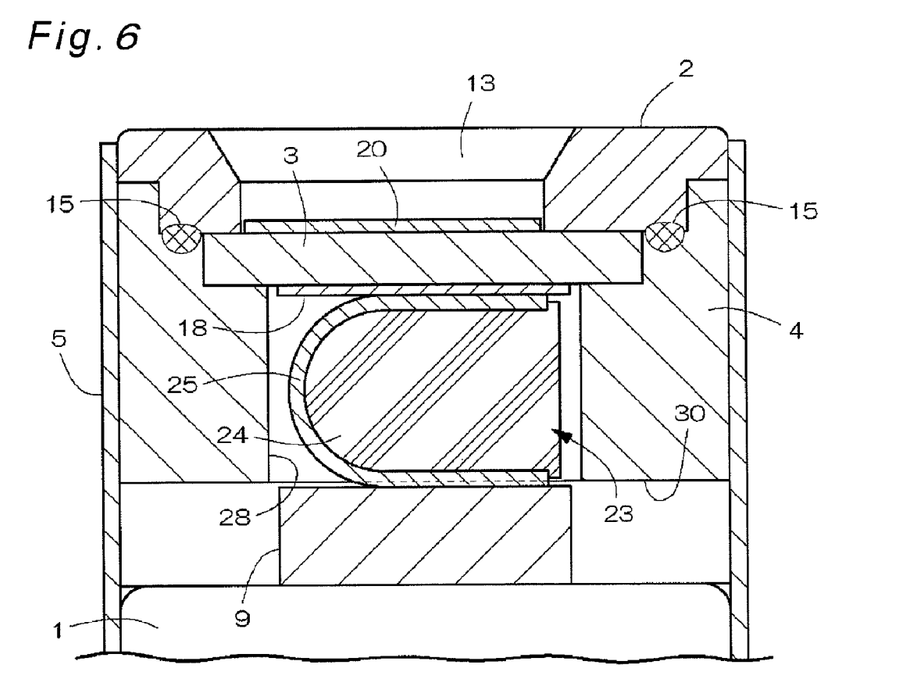
FIG. 6 is a sectional view taken along the line A-A of FIG. 1.
Figure 7:
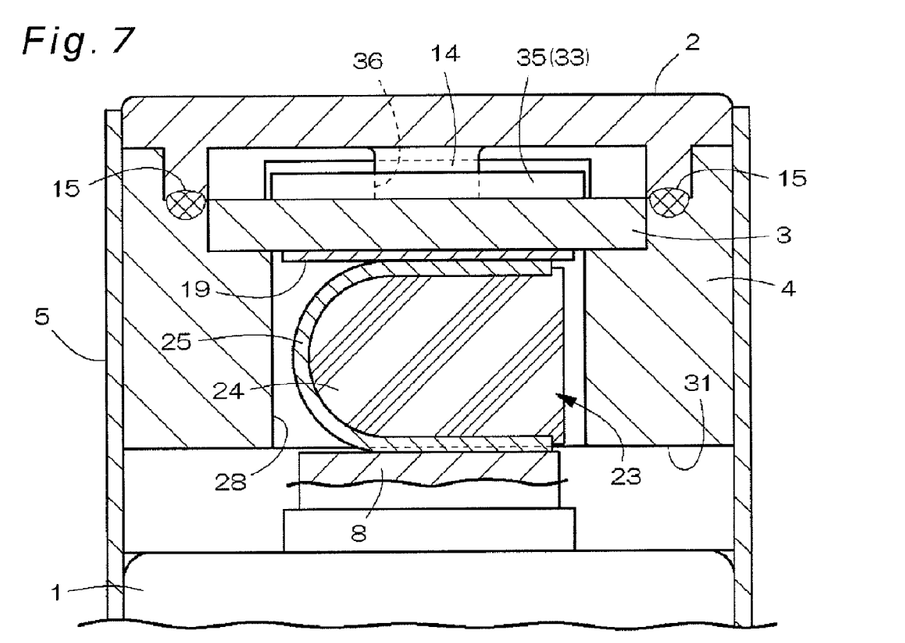
FIG. 7 is a sectional view taken along the line B-B of FIG. 1.

Between the positive and negative terminals 8, 9 of the unit cell 1 and the positive and negative terminals 18, 19 of the circuit board 3, connectors 23 are assembled, respectively. The or each connector 23, as shown in FIGS. 4, 6 and 7, is formed by using, as a base body, an elastic body 24 which is formed by molding an elastic material such as insulative silicone rubber into a cubic shape, where a plurality of thin metallic wires (conductive linear member) 25 as an electric conductor are wound and fixed on the outer surface of the elastic body 24. In this embodiment, for example, the diameter of each thin metallic wire 25 is set to 0.04 mm (40 µm), and its winding pitch is set to 0.1 mm. The left-right size of the connector 23 is set to 3 mm, and 30 pieces of thin metallic wires 25 (in the figure, only seven pieces of thin metallic wires are shown for illustration's sake) are wound on the elastic body 24. It is noted that the number of thin metallic wires 25 to be used for one connector 23 varies depending on the diameter and winding pitch of the thin metallic wires 25 and the left-right size of the connector 23, without limitation to the aforementioned number. For example, the number of thin metallic wires 25 may be set in a range from several pieces to several tens of pieces.

Upper and lower surfaces of the elastic body 24 are horizontal planes, and the thin metallic wires 25 are placed on surfaces of the elastic body 24 so as to be wound longitudinally on three surfaces of the elastic body 24, i.e., its upper and lower surfaces (their opposing portions) and its one surface (front face) that interconnect the upper and lower surfaces. That is, the thin metallic wires 25 are placed on surfaces of the elastic body 24 so as to be wound not over the entire connector 23 but along part of the surfaces of the connector 23. Alternatively, the thin metallic wires 25 may also be placed so as to be wound around over the entire connector 23. Further, the front face of the connector 23 is formed as a protrusive arc face that protrudes forward. By this protrusive arc face, the thin metallic wires 25 can effectively be prevented from being bent and fracturing at corner portions of the elastic body 24.

Referring to FIG. 2, the holder 4 is formed from a thermoplastic plastic material such as polycarbonate into a left-right longer quadratic prism-shaped block member. In the top face of the holder 4 is formed a fitting recess portion 27 (an example of the circuit board holding portion) for fitting and setting the circuit board 3 therein is formed in a stepped shape. At left-and-right two places of the fitting recess portion 27 are formed fitting holes (an example of the connector holding portion) 28 which extend up-down through and which serve for positioning and holding connectors 23 therein, respectively. Between these fitting holes 28 is formed a recess portion 29 corresponding to a mold portion 17 of the circuit board 3. Also, recessed cutout portions 30, 31 for reception of the positive terminal 9 or the negative terminal 8 of the unit cell 1 are formed at the lower ends of the fitting holes 28, respectively, so that the lower face of the holder 4 except the recessed cutout portions 30, 31, when fitted onto the sealing plate 7, comes into close contact with the top face of the sealing plate 7.

When the circuit board 3, the holder 4 and the individual connectors 23 made up as described above are fitted to the unit cell 1, the positive terminal 18 of the circuit board 3 is connected to the positive terminal 9 of the unit cell 1 positioned within the recessed cutout portion 30 via the connector 23 held in one fitting hole 28. Also, the negative terminal 19 of the circuit board 3 is connected to the negative terminal 8 of the unit cell 1 positioned in the recessed cutout portion 31 via the connector 23 held in the other fitting hole 28.

Two support members 33 for fixing the exterior cover 2 and the holder 4 to the unit cell 1 are provided at upper end portions of left-and-right end faces of the exterior case 6. The support members 33 are formed as L-shaped press metal fixtures each including a leg piece 34 one end of which is fixed by laser welding to a left/right end face of the exterior case 6 and which extends upward, and a horizontal piece 35 which adjoins the other end of the leg piece 34 and which is bent inward and horizontally. In the horizontal pieces 35, through holes 36 are formed up-down through so as to permit the insertion of the junction portions 14 formed on the exterior cover 2.

The battery pack of this embodiment constructed as described above can be assembled by the following procedure as an example. Preliminarily, the positive terminal 9 and the support members 33 are fixed to the unit cell 1.

First, the holder 4 is mounted between the top face of the unit cell 1 and the horizontal pieces 35, and thereafter the connectors 23 are dropped into the fitting holes 28 of the holder 4. As a result, each of the connectors 23 is in a state that its lower face is in contact with the upper face of the positive terminal 9 or the negative terminal 8 of the unit cell 1 while its upper half portion protrudes from the upper edge of the fitting hole 28 (see FIG. 3).

Next, the circuit board 3 is fitted to the fitting recess portion 27 of the holder 4. As a result, the connectors 23 are elastically compressed vertically. By the resultant elastic restoring force of the elastic body 24, the upper and lower faces of one connector 23 are put into press contact with the upper face of the positive terminal 9 of the unit cell 1 and the positive terminal 18 of the circuit board 3, while the upper and lower faces of the other connector 23 are put into press contact with the upper face of the negative terminal 8 of the unit cell 1 and the negative terminal 19 of the circuit board 3 (see FIG. 4). Then, the thin metallic wires 25 wound on the elastic body 24 come into contact with the positive terminals 9, 18 or the negative terminals 8, 19 of the unit cell 1 and the circuit board 3 (see FIGS. 6 and 7).

After the fitting of the circuit board 3, the exterior cover 2, which covers the circuit board 3, is integrally united to the holder 4 by ultrasonic welding. More specifically, the junction portions 14 at left-and-right both ends of the exterior cover 2 are inserted from above into the through holes 36 of the support members 33 so that the exterior cover 2 is mounted on the holder 4, and subsequently forward ends of the junction portions 14, 15 of the exterior cover 2 and the outer surface of the holder 4 are joined and fixed together by ultrasonic welding. As a result, the exterior cover 2 and the holder 4 are fixed to the pair of support members 33, 33. Finally, a facing label 5 is attached and set, where the assembly of the battery pack is completed.

As shown above, in this embodiment, the connectors 23 are provided by using, as a base body, the elastic body 24 formed by molding of an elastic material into a generally cubic shape. Therefore, when the connectors 23 are assembled to the unit cell 1, the connectors 23 can be put into press contact between the positive terminals 9, 18 or the negative terminals 8, 19 of the unit cell 1 and the circuit board 3 by elastic restoring force of the elastic body 24, so that upper and lower faces of the connectors 23 can be put into strong contact with the terminals 8, 9, 18, 19. As a result, contactability between the positive and negative terminals 8, 9, 18, 19 of the unit cell 1 and the circuit board 3 and surfaces of the connectors 23 opposed thereto can be enhanced, by which electrical connectability between the unit cell 1 and the circuit board 3 can be improved. Accordingly, occurrence of chattering can be suppressed, so that a battery pack of high reliability can be obtained. This battery pack has no need for the welding work of the connectors 23 and the positive and negative terminals 8, 9, 18, 19, so that the battery pack excels also in eliminating the possibility of connection failures due to welding failures.

By virtue of the use of the elastic body 24 formed from an elastic material, the elastic body 24, which itself is elastically deformed, can be set for a large elastic deformation range while the connectors themselves are reduced in size as compared with plate spring-like connectors. Thus, the battery pack is less susceptible to parts precision of the connectors themselves, opposing distance precision between terminals, assembly precision and the like, allowing a stable electrical connection state between terminals to be obtained.

With compression coil-type or plate spring-type connectors, there is a tendency that connectors are more likely to be entangled with one another during the carriage or the like, making it difficult, in particular, to undo them from entangled to separated state, which leads to another difficulty in full automatization of the assembling work for the battery pack. In contrast to this, with the connectors 23 formed with the elastic body 24 molded from an elastic material into a generally cubic shape as in this embodiment, there is no possibility that the connectors 23 may be entangled with one another during the carriage or the like, making it easy to pick up the connectors 23 one by one to assemble them to specified positions. Accordingly, the assembling work for the battery pack can be fully automated, contributing to reduction in manufacturing cost of the battery pack.

In the case where the fitting portions 28 for assembling the connectors 23 are provided in the holder 4 that supports the circuit board 3, positional shifts of the connectors 23 can be prevented, so that the connectors 23 can be put, normally in proper posture, into close contact with the electrode terminals 8, 9, 18, 19 of the unit cell 1 and the circuit board 3. Accordingly, the contactability between the terminals 8, 9, 18, 19 of the unit cell 1 and the circuit board 3 and the connectors 23 can be enhanced, by which electrical connectability between the unit cell 1 and the circuit board 3 can be improved.

In addition, in the case where the fitting portions 28 are formed as through holes, the connectors 23 can be assembled to proper positions between the two electrode terminals only by dropping the connectors 23 into the fitting portions 28. Accordingly, full automatization of the assembling work of the battery pack can be facilitated.

When the resin-made exterior cover 2 is joined and fixed to the resin-made holder 4 by ultrasonic welding, the exterior cover 2 and the holder 4 can be fixed properly at all times in close contact with each other by eliminating variations in the assembling state between the exterior cover 2 and the holder 4, as compared with the case in which the exterior cover 2 and the holder 4 are mechanically engaged and fixed to each other. Thus, a battery pack stable in configuration and function can be obtained.

In the case where the protrusive junction portions 14 are provided on the surface of the exterior cover 2 that is to be opposed to the holder 4, and where the junction portions 14 and the outer surface of the holder 4 are integrally united to each other by ultrasonic welding so that the exterior cover 2 is joined and fixed to the holder 4, it becomes possible to properly slide and move the junction portions 14 of the exterior cover 2 and the opposite surface of the holder 4 relative to each other so that a secure friction welding therebetween can be achieved. Since welding conditions can be maintained constant, variations in welding area or welding pattern between the junction portions 14 and the holder 4 can also be suppressed.

The support members 33 each formed of an L-shaped press metal fixture including the leg piece 34 and the horizontal piece 35 are provided at upper end portions of the unit cell 1, and with the junction portions 14 of the exterior cover 2 inserted into the through holes 36 provided in the horizontal pieces 35, forward ends of the junction portions 14 and the outer surface of the holder 4 are integrally united together by ultrasonic welding, thus making it possible to achieve a form that the exterior cover 2 and the holder 4 are fixed to the unit cell 1. In this case, since the exterior cover 2, the holder 4 and the unit cell 1 can be integrated together via the support members 33, the exterior cover 2 and the holder 4 can securely be prevented from separating and falling from the unit cell 1 even on occurrence of fall impact or collision impact or the like.

Furthermore, after the holder 4 is mounted between the top face of the unit cell 1 and the horizontal pieces 35, the connectors 23 are fitted to the fitting portions 28 of the holder 4, then the circuit board 3 is mounted on the holder 4, and the exterior cover 2 is ultrasonic welded to the holder 4. Thus, simply by these steps, the battery pack can be assembled. Accordingly, the assembling work of the battery pack can be facilitated, making it possible to fulfill full automatization of the work.

Second Embodiment

Figure 8:
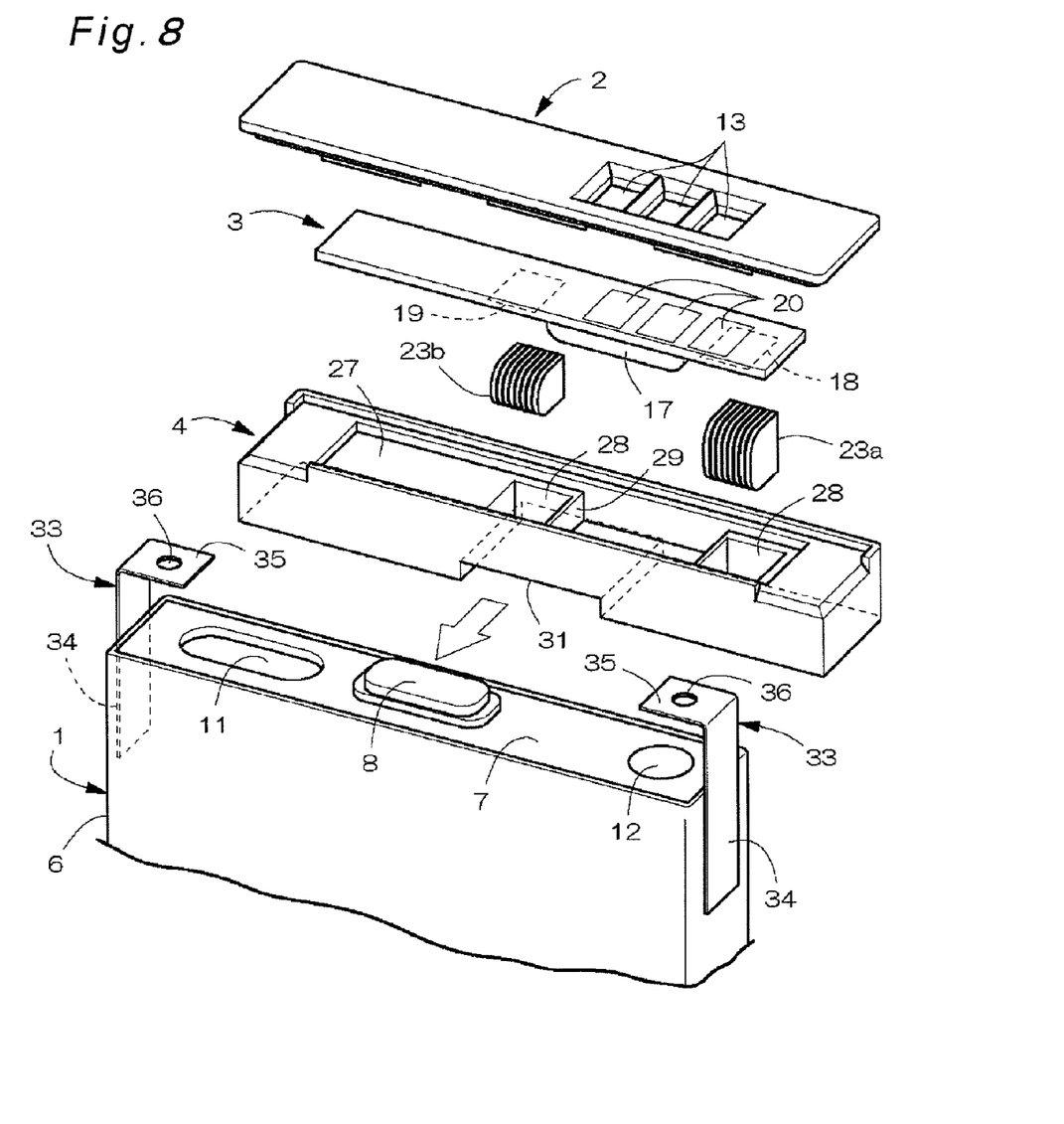
FIG. 8 is a partly broken exploded perspective view of a battery pack according to a second embodiment.
Figure 9:
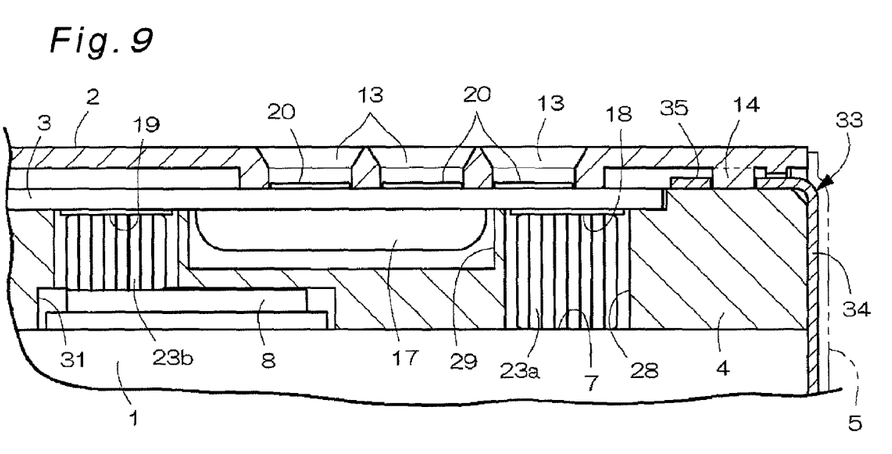
FIG. 9 is a longitudinal front view of main part of the battery pack of the second embodiment.

FIGS. 8 and 9 show a second embodiment of the battery pack according to the invention. The second embodiment differs from the first embodiment in that two connectors 23a, 23b are different in height (up-down size) from each other. More specifically, the block piece 9, which is provided in the first embodiment with a view to aligning the height positions of the positive and negative terminals of the unit cell 1, is eliminated, and vertical size of the connector 23a that connects the positive terminals of the unit cell 1 and the circuit board 3 to each other is set larger than the vertical size of the connector 23b that connects their negative terminals to each other. Further, the recessed cutout portion 30 at the lower end of one fitting hole 28 of the holder 4 is omitted. This second embodiment is otherwise similar to the foregoing first embodiment, and therefore like component members are designated by like reference numerals with their description omitted. In this second embodiment also, functional effects similar to those of the first embodiment can be obtained.

Third Embodiment

Figure 10:
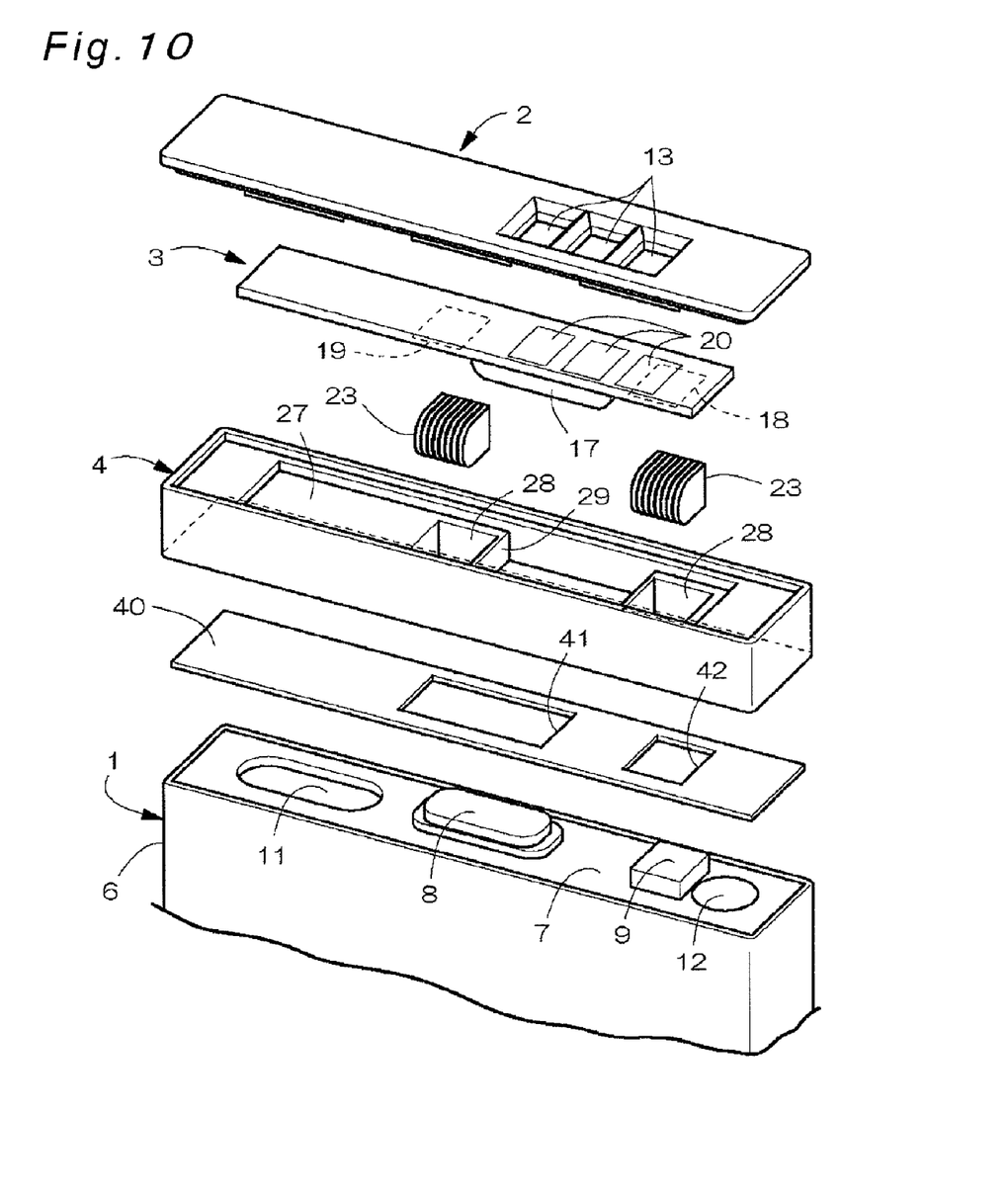
FIG. 10 is a partly broken exploded perspective view of a battery pack according to a third embodiment.
Figure 11:
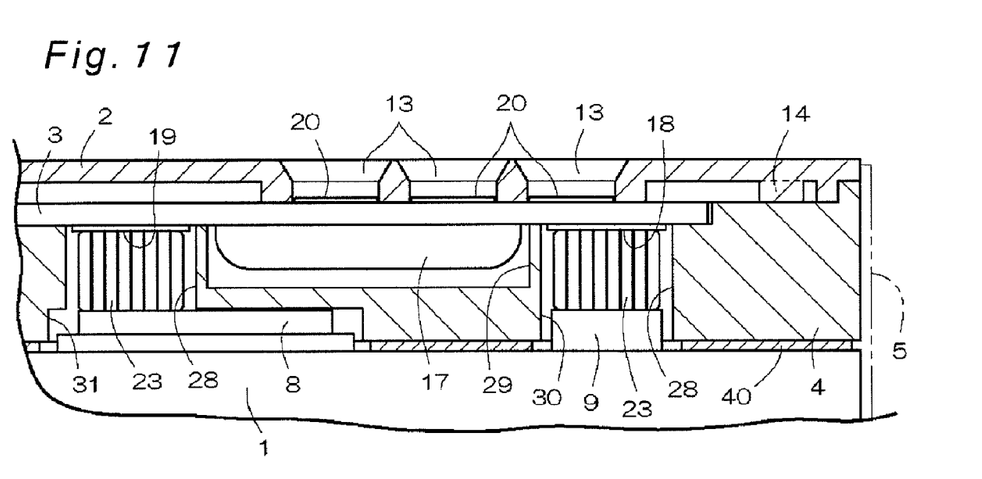
FIG. 11 is a longitudinal front view of main part of the battery pack of the third embodiment.

FIGS. 10 and 11 show a third embodiment of the battery pack according to the invention. In this embodiment, the two support members 33 are eliminated from the foregoing first embodiment, and the holder 4 is fixed to the top face of the unit cell 1 (top face of the sealing plate 7) by double-sided tape 40. Front-rear, right-left sizes of the double-sided tape 40 are set slightly smaller than those of the top face of the unit cell 1, and openings 41, 42 for exposing the negative terminal 8 or the block piece (positive terminal) 9 upward are formed at a center of the double-sided tape 40 and its one left/right side end portion (right side end in the example of the figure), respectively. This third embodiment is otherwise similar to the foregoing first embodiment, and therefore like component members are designated by like reference numerals with their description omitted. In this third embodiment also, functional effects similar to those of the first embodiment can be obtained.

Furthermore, as a modification of the third embodiment, any arbitrary junction means such as laser welding may be used for fixation of the holder 4 to the top face of the unit cell 1. The block piece 9 in the first and third embodiments may also be fixed on the circuit board 3 side.

Figure 12:
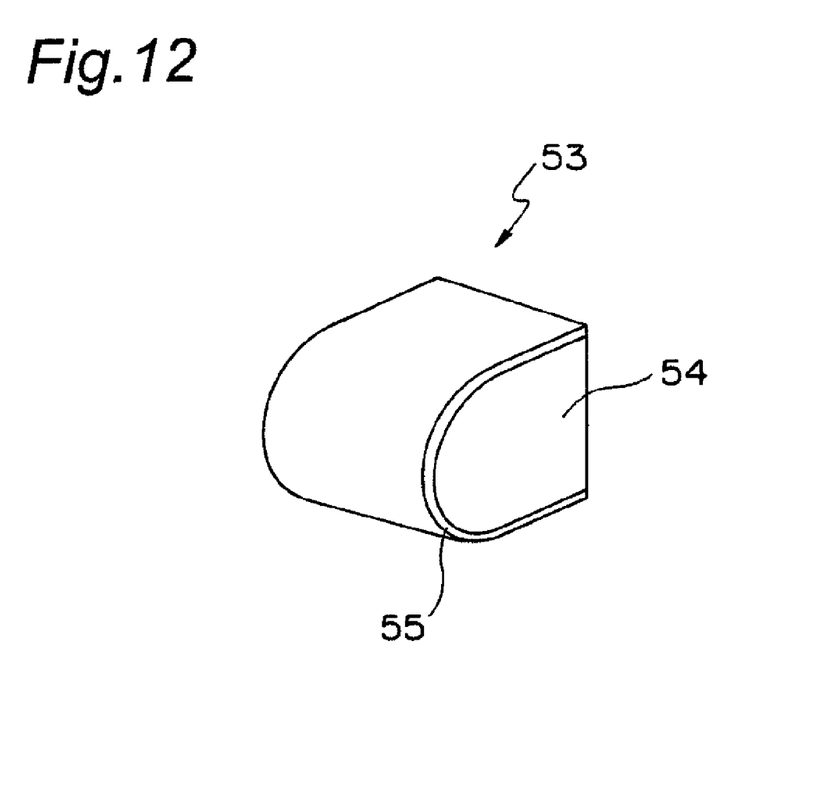
FIG. 12 is a schematic perspective view of a connector according to a modification of the first embodiment.

The foregoing embodiments have been described on cases in which a plurality of thin metallic wires 25 are wound and set as a conductor on the surfaces of the elastic body 24 of each connector 23, as an example. However, the mode in which the connectors are provided is not limited to such a case. For instance, as shown by a connector 53 in the schematic perspective view of FIG. 12, a mode in which a metal thin film 55 is placed as a conductor on the surface of an elastic body 54 may also be adopted. Thus, in such a mode as the metal thin film 55 is used, larger amounts of current can be put into flow, as compared with the cases in which the thin metallic wires 25 are used, producing an advantage that the battery pack becomes ready for higher current capacity.

Figure 13:
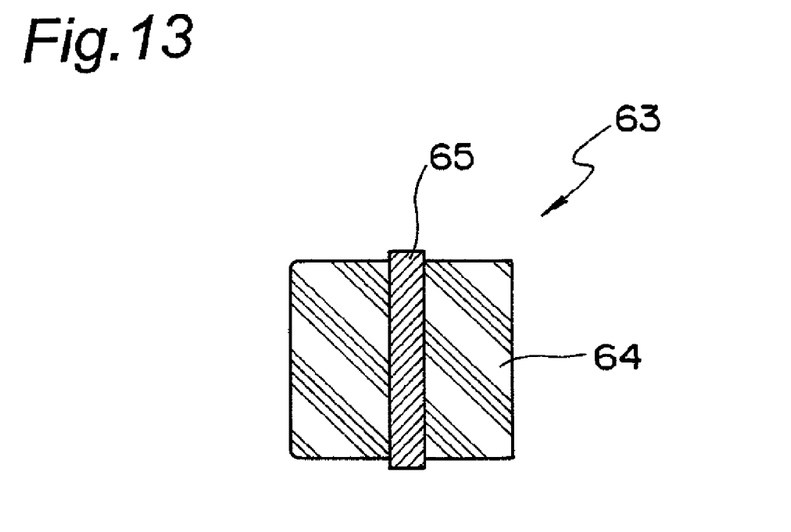
FIG. 13 is a schematic sectional view of a connector according to yet another modification.

Also, as in a case of a connector 63 shown in the schematic sectional view of FIG. 13, it is also possible to adopt a mode in which a conductor (e.g., thin metallic wire) 65 is placed so as to extend through upper and lower surfaces of an elastic body 64.

More specifically, in the connector, the conductor is placed so as to be exposed at, at least, opposite positions (e.g., on upper and lower faces) on surfaces of the elastic body, where it is required only that exposed portions of the conductor in those opposite positions are electrically connected to each other. More preferably, the conductor is formed into such thickness or thinness as to more or less follow deformations of the elastic body when the elastic body is elastically compressed and deformed.

Furthermore, in the case where the positive terminal 9 is formed from aluminum, the electrical conduction between the positive terminals 9, 18 tends to become higher in contact resistance, as compared with electrical conduction between the negative terminals 8, 19 that are scarcely formed from aluminum. Therefore, it is preferable that specifications of the elastic body or the height of the elastic body, the distance between electrode terminals or the like are adjusted so that the elastic force of the elastic body used for the connector (posi-tive connector) to be placed between the positive terminals becomes higher, in an elastic compression state, than the elastic force of the elastic body used for the connector (negative connector) to be placed between the negative terminals.

Also, although the above embodiments have been described on cases where the holder 4 and the exterior cover 2 are joined and fixed by ultrasonic welding, various other fixing methods such as mechanical fixing means or the like may be applied.

It is to be noted that, by properly combining the arbitrary embodiments of the aforementioned various embodiments, the effects possessed by them can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The entire disclosure of Japanese Patent Application No. 2007-251794 filed on Sep. 27, 2007 including specification, claims, and drawings are incorporated herein by reference in its entirety.

What is claimed is:

1. A battery pack comprising:
a unit cell in which a first electrode terminal is formed on a terminal formation surface;
an exterior cover fixed so as to cover the terminal formation surface of the unit cell;
a circuit board which has a protection circuit for controlling a charging current and a second electrode terminal electrically connected to the protection circuit, and which is placed inside the exterior cover so that the second electrode terminal is opposed to the first electrode terminal of the terminal formation surface of the unit cell; and
a connector placed between the first electrode terminal and the second electrode terminal so as to electrically connect the first electrode terminal and the second electrode terminal to each other, wherein
the connector comprises:
an elastic body formed from an elastic material; and
a conductor which is fixed to the elastic body so as to be exposed at, at least, opposite positions in surfaces of the elastic body and which makes the exposed portions in the opposite positions electrically connected to each other, wherein
in a state that the elastic body is elastically compressed so that the exposed portions of the conductor in the opposite positions are in press contact with the first electrode terminal and the second electrode terminal, respectively, the first electrode terminal and the second electrode terminal are maintained electrically connected to each other by the connector.

2. The battery pack as defined in claim 1, wherein the elastic body is formed from a rubber material.

3. The battery pack as defined in claim 1, wherein the conductor is a conductive thin film placed on the surface of the elastic body.

4. The battery pack as defined in claim 1, wherein the conductor is a plurality of conductive linear members placed on the surface of the elastic body.

5. The battery pack as defined in claim 4, wherein a plurality of conductive linear members are wound on the surface of the elastic body.

6. The battery pack as defined in claim 1, further comprising
a holder for holding the circuit board, the holder being fixed, inside the exterior cover, to the terminal formation surface of the unit cell, wherein
the holder comprises:
a connector holding portion having a through hole shape for holding a placement position of the connector in a state that the conductor is in contact with the first electrode terminal of the unit cell; and
a circuit board holding portion having a recessed shape for holding the circuit board in a state that the elastic body is elastically compressed while the second electrode terminal of the circuit board is kept in contact with the conductor of the connector held by the connector holding portion.

7. The battery pack as defined in claim 6, wherein the exterior cover and the holder are formed from resin material, and the exterior cover and the holder are joined and fixed to each other by ultrasonic welding.

8. The battery pack as defined in claim 7, wherein
protrusive junction portions are provided in opposing surfaces of the exterior cover and the holder, and
the junction portions and an outer surface of the holder are integrally united together by ultrasonic welding, whereby the exterior cover and the holder are joined and fixed together.

9. The battery pack as defined in claim 8, wherein
a support member for fixing the exterior cover and the holder is fixed at an upper end portion of the unit cell,
the support member is an L-shaped metal fixture including a leg piece whose one end is fixed to the unit cell and which extends vertically, and a horizontal piece which adjoins the other end of the leg piece and which is bent horizontally,
a through hole into which a protrusive junction portion is to be inserted is formed in the horizontal piece,
the holder and the circuit board are placed between an upper end of the unit cell and the horizontal piece, and
forward ends of the junction portions inserted into the through holes and the outer surface of the holder are integrally united together by ultrasonic welding, whereby the exterior cover and the holder are fixed to the support member.

* * * * *

UNITED STATES PATENT AND TRADEMARK OFFICE
CERTIFICATE OF CORRECTION

PATENT NO. : 8,080,333 B2  
APPLICATION NO. : 12/239605  
DATED : December 20, 2011  
INVENTOR(S) : Osamu Akatsuchi et al.

Page 1 of 1

It is certified that error appears in the above-identified patent and that said Letters Patent is hereby corrected as shown below:

ON THE TITLE PAGE:

At item (73), Assignee, change:

"Hitachi Maxell Engery, Ltd., Otokuni-Gun, Kyoto (JP)"

to

--Hitachi Maxell Energy, Ltd., Otokuni-Gun, Kyoto (JP)--.

At item (56), References Cited, under "OTHER PUBLICATIONS", change:

"Machine English translation of JP-2003-197270-A which published Apr. 27, 2006."

to

--Machine English translation of JP-2003-197270-A which published Jul. 11, 2003.--

Signed and Sealed this
Twenty-ninth Day of May, 2012

David J. Kappos
*Director of the United States Patent and Trademark Office*